(12) United States Patent
Saito et al.

(10) Patent No.: US 12,495,104 B2
(45) Date of Patent: Dec. 9, 2025

(54) DATA NODE, DATA NODE MANAGEMENT METHOD, AND DATA NODE MANAGEMENT PROGRAM

(71) Applicant: NTT, Inc., Tokyo (JP)

(72) Inventors: Masatoshi Saito, Musashino (JP); Takayoshi Hirasawa, Musashino (JP)

(73) Assignee: NTT, Inc., Tokyo (JP)

( * ) Notice: Subject to any disclaimer, the term of this patent is extended or adjusted under 35 U.S.C. 154(b) by 454 days.

(21) Appl. No.: 18/012,034

(22) PCT Filed: Jun. 26, 2020

(86) PCT No.: PCT/JP2020/025369
§ 371 (c)(1),
(2) Date: Dec. 21, 2022

(87) PCT Pub. No.: WO2021/260948
PCT Pub. Date: Dec. 30, 2021

(65) Prior Publication Data
US 2023/0262149 A1   Aug. 17, 2023

(51) Int. Cl.
*H04L 12/66* (2006.01)
*H04L 45/645* (2022.01)
*H04L 69/324* (2022.01)

(52) U.S. Cl.
CPC .......... *H04L 69/324* (2013.01); *H04L 45/645* (2022.05)

(58) Field of Classification Search
CPC ......... H04L 45/24; H04L 45/02; H04L 45/22; H04L 45/66; H04L 12/4641; H04L 12/462; H04L 12/4633; H04L 2012/4629; H04L 12/66; H04L 49/25; H04L 45/26
See application file for complete search history.

(56) References Cited

U.S. PATENT DOCUMENTS

| | | | | |
|---|---|---|---|---|
| 8,068,442 B1* | 11/2011 | Kompella | ............. | H04L 12/462 370/395.5 |
| 2007/0291773 A1* | 12/2007 | Khan | ...................... | H04L 67/02 370/401 |
| 2010/0061366 A1* | 3/2010 | DelRegno | ............... | H04L 45/00 370/389 |

(Continued)

OTHER PUBLICATIONS

"What is Node Slicing?," Jupiter Networks, Inc., May 7, 2020, retrieved from URL <https://www.juniper.net/jp/jp/products-services/what-is/node-slicing>, 7 pages (with Machine translation).

*Primary Examiner* — Kharye Pope
(74) *Attorney, Agent, or Firm* — Fish & Richardson P.C.

(57) ABSTRACT

A data node includes: a bridge layer adapted to mediate messages between a hardware layer adapted to transfer data with reference to an FIB indicating a forwarding address and a plurality of NOSs that set contents of the FIB for the hardware layer, wherein the bridge layer includes: a setting storage unit adapted to store setting information that associates the NOSs with those resources of the hardware layer which are available for use by the NOSs, and a message conversion unit adapted to receive messages setting the contents of the FIB from the NOSs, convert the messages according to the setting information in the setting storage unit so as to contain those resources of the hardware layer which are available for use by the NOSs, and update the contents of the FIB based on the converted messages.

8 Claims, 10 Drawing Sheets

(56) References Cited

U.S. PATENT DOCUMENTS

| | | | |
|---|---|---|---|
| 2014/0328343 A1* | 11/2014 | Kapadia | H04L 45/741 370/392 |
| 2016/0191374 A1* | 6/2016 | Singh | H04L 45/28 370/228 |
| 2019/0104104 A1* | 4/2019 | Kapadia | H04L 61/103 |
| 2020/0065141 A1* | 2/2020 | Pai | H04L 67/55 |
| 2020/0068014 A1* | 2/2020 | Sarkar | H04L 12/4641 |
| 2020/0204492 A1* | 6/2020 | Sarva | H04L 67/34 |

* cited by examiner

| ID | Name | Port | I/F |
|---|---|---|---|
| 1 | NOS10A | 0/0/0<br>0/0/1 | SAI |
| 2 | NOS10B | 0/0/2<br>0/0/3 | OF-DPA |
| 3 | NOS10C | 0/0/4<br>0/0/5 | OpenNSL |

| ID | Name | Port | I/F |
|---|---|---|---|
| 1 | NOS10A | 0/0/0 0/0/1 | OF-DPA |
| 2 | NOS10B | 0/0/2 0/0/3 | OF-DPA |

⇨

24C, 24

| ID | Name | Port | I/F |
|---|---|---|---|
| 1 | NOS10A | 0/0/0 0/0/1 0/0/4 | OF-DPA |
| 2 | NOS10B | 0/0/2 0/0/3 | OF-DPA |

DATA NODE, DATA NODE MANAGEMENT METHOD, AND DATA NODE MANAGEMENT PROGRAM

CROSS-REFERENCE TO RELATED APPLICATIONS

This application is a National Stage application under 35 U.S.C. § 371 of International Application No. PCT/JP2020/025369, having an International Filing Date of Jun. 26, 2020, the disclosure of which is considered part of the disclosure of this application, and is incorporated by reference in its entirety into this application.

TECHNICAL FIELD

The present invention relates to a data node, a data node management method, and a data node control program.

BACKGROUND ART

Conventionally, a communications device such as a switch is sold in a state in which hardware mounted on the communications device and software such as a NOS (Network Operating System) operating on the hardware are integrated. That is, implementation details inside the communications device are hidden from (provided as a black box to) the user.

On the other hand, there is a need for the user to freely add functions to the communications device. Thus, white box equipment has been proposed that allows the user to freely develop software operating on a communications device equipped with an ASIC (Application Specific Integrated Circuit) as hardware.

Figure 8:
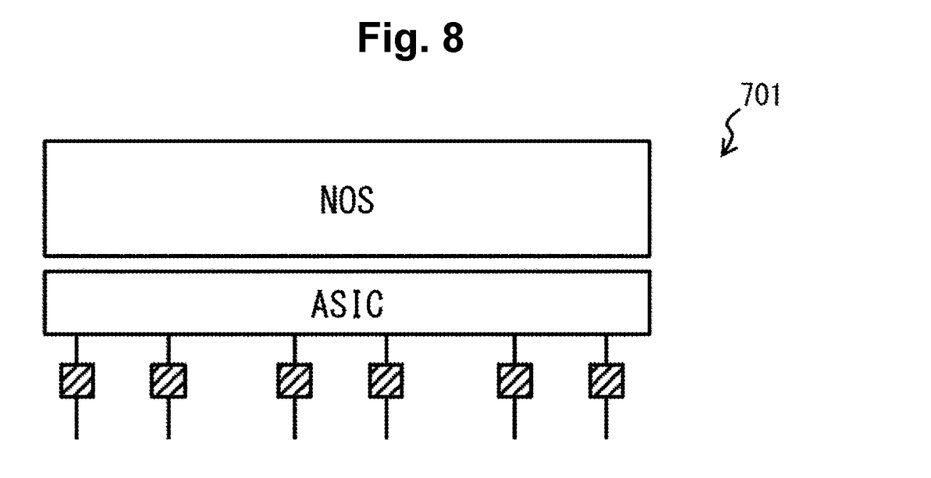
FIG. 8 is a block diagram showing an example of white box equipment.

FIG. 8 is a block diagram showing an example of white box equipment 701.

The white box equipment 701 includes, in order from the bottom of FIG. 8, a physical layer (PHY) made up of six communications ports indicated by shaded rectangles, an ASIC adapted to perform a transfer process at high speed by bundling the PHY, and a NOS adapted to perform transfer control over the ASIC.

Non-patent Literature 1 describes "node slicing" that links one or more data planes, which are pieces of hardware in a communications device, to one VM (Virtual Machine) operating on the communications device. A redundant configuration, in which plural VMs operate on a single communications device, improves reliability in case of software failure because even if one VM fails, another VM operates as a substitute.

CITATION LIST

Non-Patent Literature

Non-patent Literature 1: Juniper Networks, "Juniper Networks, 'About Node Slicing'," found online on an Internet site at https://www.juniper.net/jp/jp/products-services/what-is/node-slicing/on May 27, 2020

SUMMARY OF THE INVENTION

Technical Problem

Non-patent Literature 1 describes a technique for allowing one piece of software (VM) to use plural hardware resources. On the other hand, there is a need for allowing plural pieces of software (NOS) to share one hardware resource.

For example, a use case will be discussed, in which a single ASIC is mounted (linked) by being shared by plural NOSs and the ASIC is divided into NOS resources thereby to improve resource efficiency of the ASIC.

Figure 9:
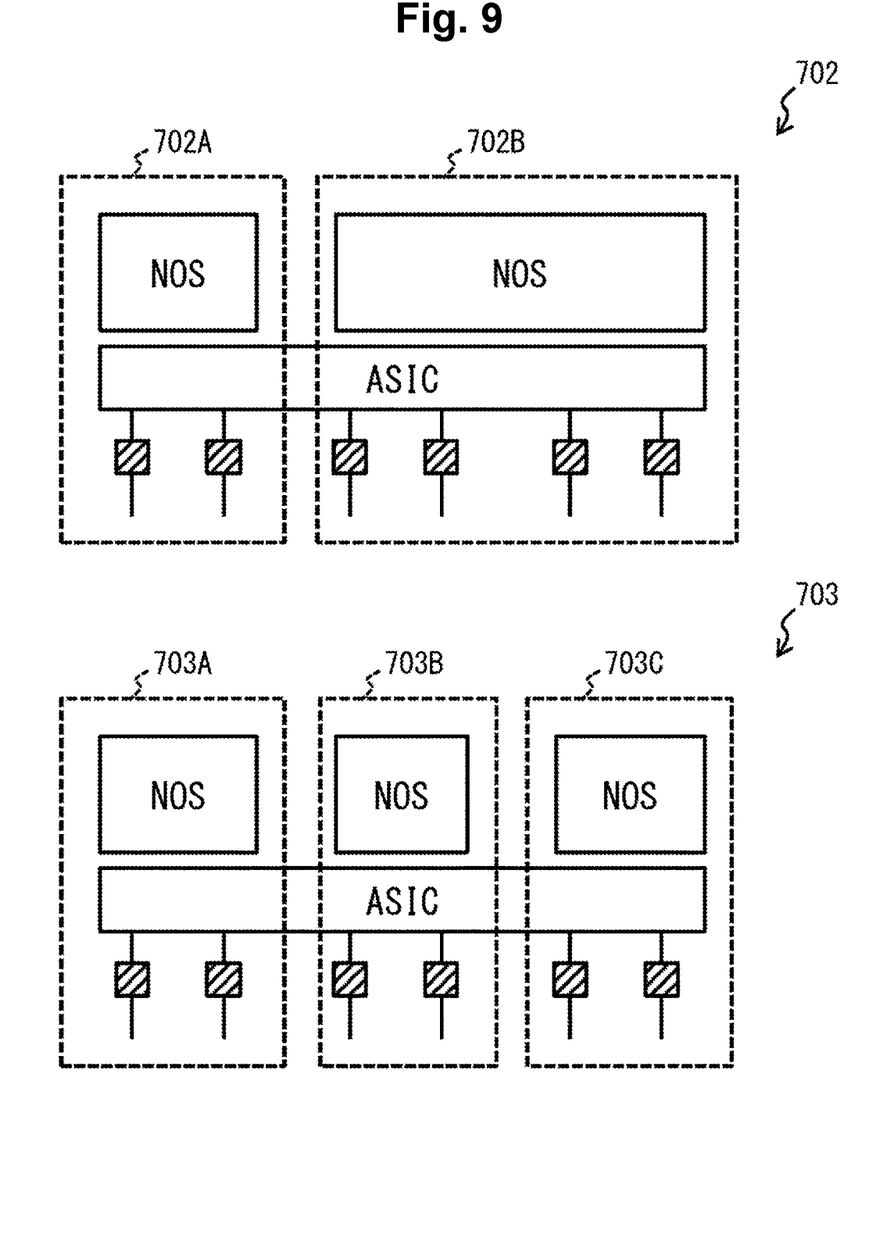
FIG. 9 is a block diagram showing how the white box equipment of FIG. 8 is divided into resources.

FIG. 9 is a block diagram showing how the white box equipment of FIG. 8 is divided into resources.

As an example of dividing resources into logic units by function, white box equipment 702 is configured such that the same ASIC is shared by a logic unit 702A on which L3VPN (Layer 3 Virtual Private Network) operates and a logic unit 702B on which L2VPN (Layer 2 Virtual Private Network) operates.

As an example of dividing resources into logic units by use, white box equipment 703 is configured such that the same ASIC is shared by a logic unit 703A used by a first department of a company, a logic unit 703B used by a second department of the company, and a logic unit 703C used by a third department of the company. Besides, resources may also be divided into logic units according to experimental net.

In this way, when a processing load of an individual logic unit is too light, if logic units are integrated into white box equipment 702 or 703, costs can be reduced compared to when a dedicated physical device is provided for each logic unit.

Figure 10:
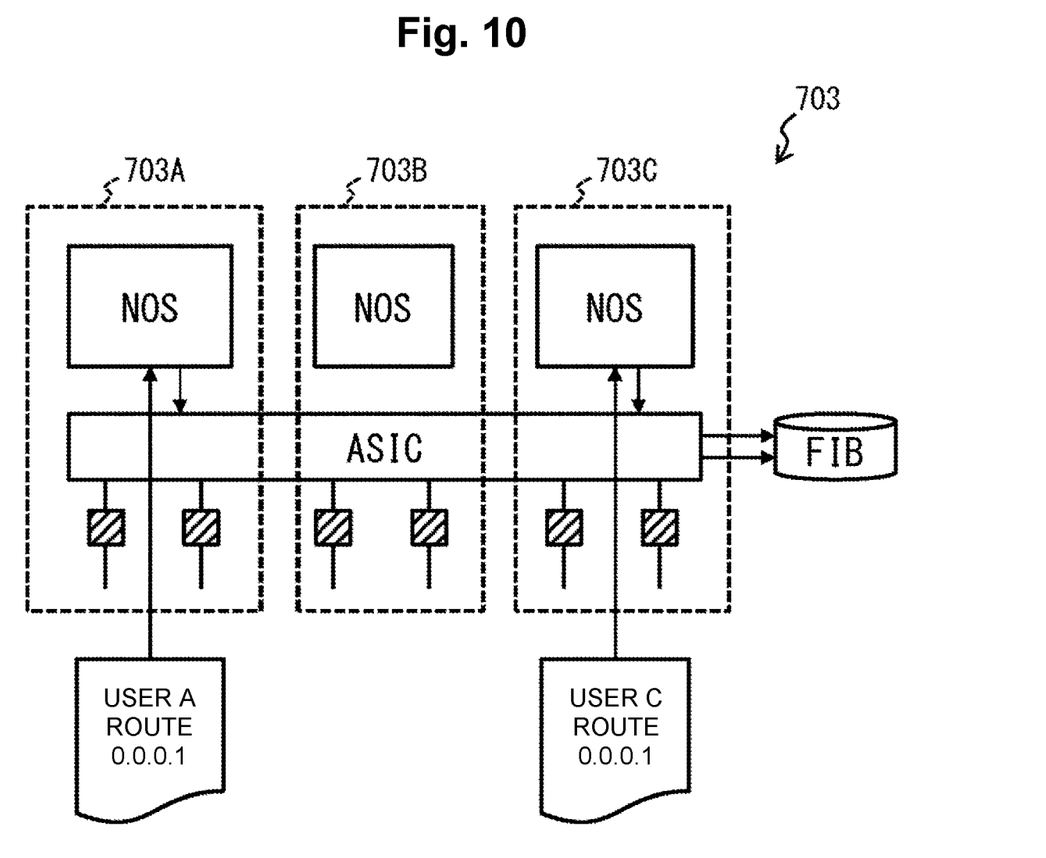
FIG. 10 is a block diagram showing a problem with the resource division of FIG. 9.

FIG. 10 is a block diagram showing a problem with the resource division of FIG. 9.

The NOS of the logic unit 703A receives a notification about a route "0.0.0.1" of user A and calls a write command to a route control table (FIB: Forwarding Information Base) to associate the route with the port information (the second PHY from left in FIG. 10) about the NOS as a forwarding address of the route.

The NOS of the logic unit 703C receives a notification about a route "0.0.0.1" of user C and calls a write command to the FIB to associate the route with the port information (the fifth PHY from left in FIG. 10) about the NOS as a forwarding address of the route. Note that user A and user C are different users that use the same route "0.0.0.1" by coincidence.

Here the ASIC receives commands from the two NOSs, and if the route "0.0.0.1" is written as it is into the FIB, the route "0.0.0.1" to "the second PHY from left" written first will be overwritten by the route "0.0.0.1" to "the fifth PHY from left" and lost.

The reason why the loss occurs is that the existing NOS is not designed to divide and share hardware resources with other NOSs. Note that expanding the NOS itself to share resources will cause a large operational burden, and thus something other than the NOS needs to be expanded.

Thus, a main object of the present invention is to divide hardware resources of a data node and make the hardware resources controllable by plural NOSs.

Means for Solving the Problem

To solve the above problem, a data node according to the present invention has the following features.

The data node comprises a bridge layer adapted to mediate messages between a hardware layer that transfers data with reference to an FIB indicating a forwarding address and a plurality of NOSs that set contents of the FIB for the hardware layer, wherein the bridge layer includes: a setting storage unit adapted to store setting information that associates the NOSs with those resources of the hardware layer which are available for use by the NOSs; and a message processing unit adapted to receive messages setting the contents of the FIB from the NOSs, convert the messages according to the setting information in the setting storage unit so as to contain those resources of the hardware layer which are available for use by the NOSs, and update the contents of the FIB based on the converted messages.

Effects of the Invention

The present invention can divide hardware resources of a data node and make the hardware resources controllable by plural NOSs.

DESCRIPTION OF EMBODIMENTS

An embodiment of the present invention will be described in detail below with reference to the accompanying drawings.

Figure 1:
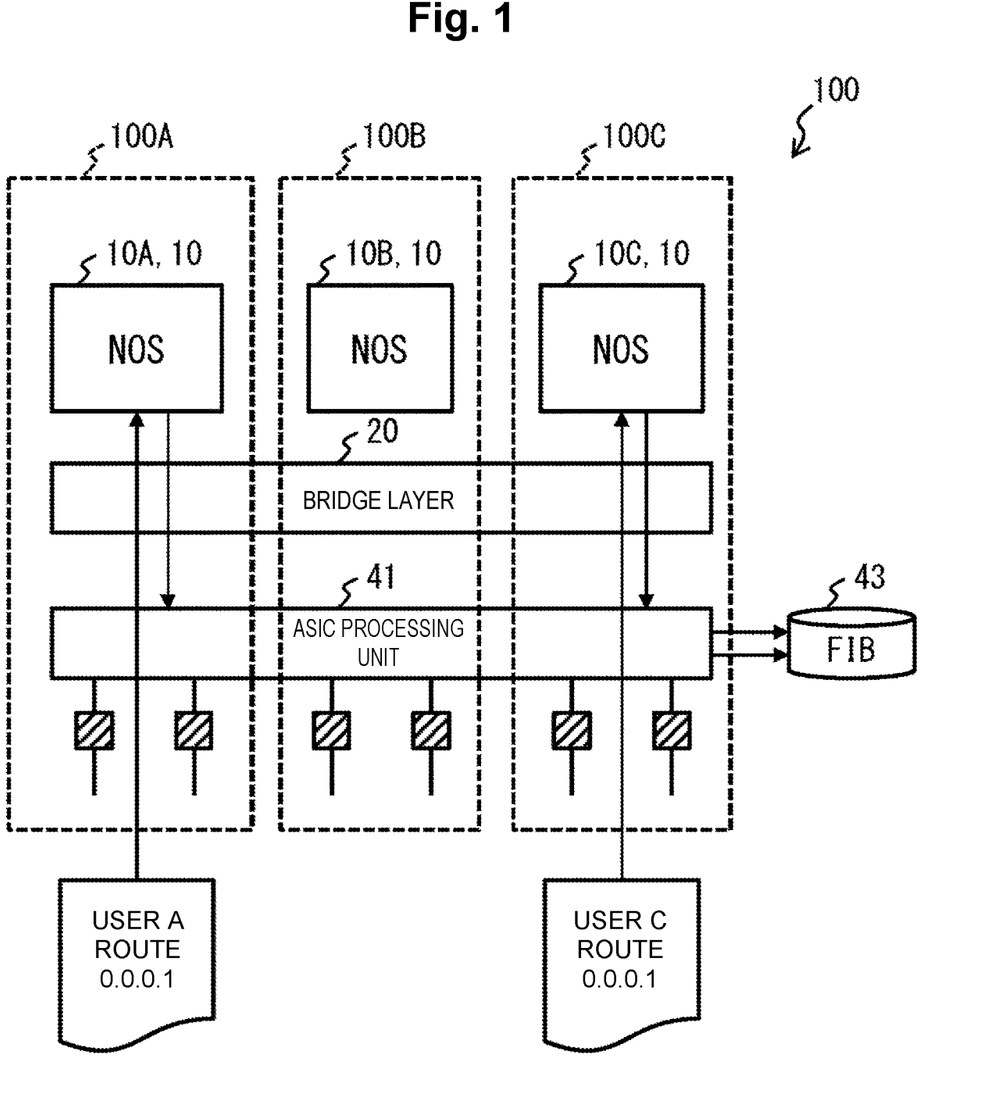
FIG. 1 is a configuration diagram outlining a data node according to an embodiment of the present invention.

FIG. 1 is a configuration diagram outlining a data node 100.

The data node 100 of FIG. 1 can be divided into resources, i.e., logic units 100A, 100B, and 100C as with FIG. 10. Note that the number of resource divisions is not limited to three such as indicated in FIG. 1. Thus, the data node 100 includes plural NOSs (NOSs 10A, 10B, 10C for respective logic units), an ASIC processing unit 41, a physical layer (PHY) made up of six communications ports indicated by shaded rectangles, and an FIB 43.

On the other hand, the data node 100 of FIG. 1 has a bridge layer 20 placed as components between the NOSs 10 and ASIC processing unit 41. The bridge layer 20 converts resource information to be written out to the FIB 43 into a message as appropriate such that resource information (port information such as "the second port" or routing information such as "0.0.0.1") written into the FIB 43 will no conflict with one another among the plural NOSs 10.

Consequently, even if each of the NOSs 10 does not know behavior of the other NOSs, the NOS can operate as if the NOS exclusively owns hardware resources of the data node 100.

Note that the bridge layer 20 is implemented by a background program, container, or the like. The NOSs 10 and the bridge layer 20 may be constructed in the data node 100 (white box switch) or in an external server, which is a device separate from the data node 100.

A control driver of the ASIC processing unit 41 is implement based on, for example, specifications open to the public such as an OFDPA Pipeline model. For example, a "vrf table" of the OFDPA Pipeline model can be utilized to divide routing information.

Figure 2:
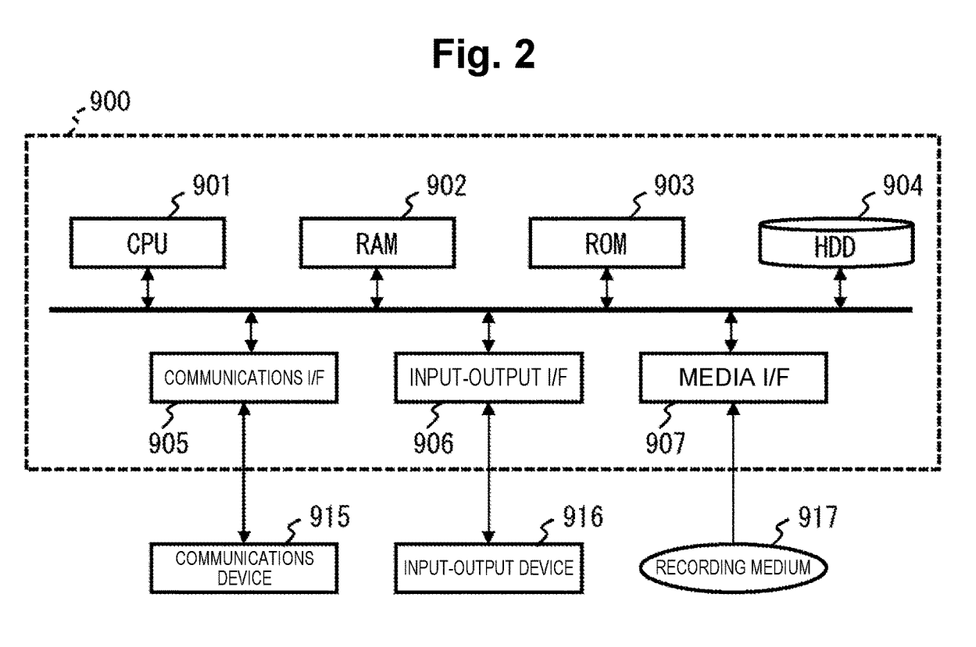
FIG. 2 is a hardware configuration diagram of the data node according to the present embodiment.

FIG. 2 is a hardware configuration diagram of the data node 100.

The data node 100 is configured as a computer 900 that includes a CPU 901, a RAM 902, a ROM 903, an HDD 904, a communications I/F 905, an input-output I/F 906, and a media I/F 907.

The communications I/F 905 is connected with an external communications device 915. The input-output I/F 906 is connected with an input-output device 916. The media I/F 907 reads and writes data from/to a recording medium 917. Furthermore, the CPU 901 executes a program (also referred to as an application, or abbreviated to an app) loaded into the RAM 902 and thereby controls various processing units. The program can be distributed via a communications line or distributed by being recorded on the recording medium 917 such as a CD-ROM.

Figure 3:
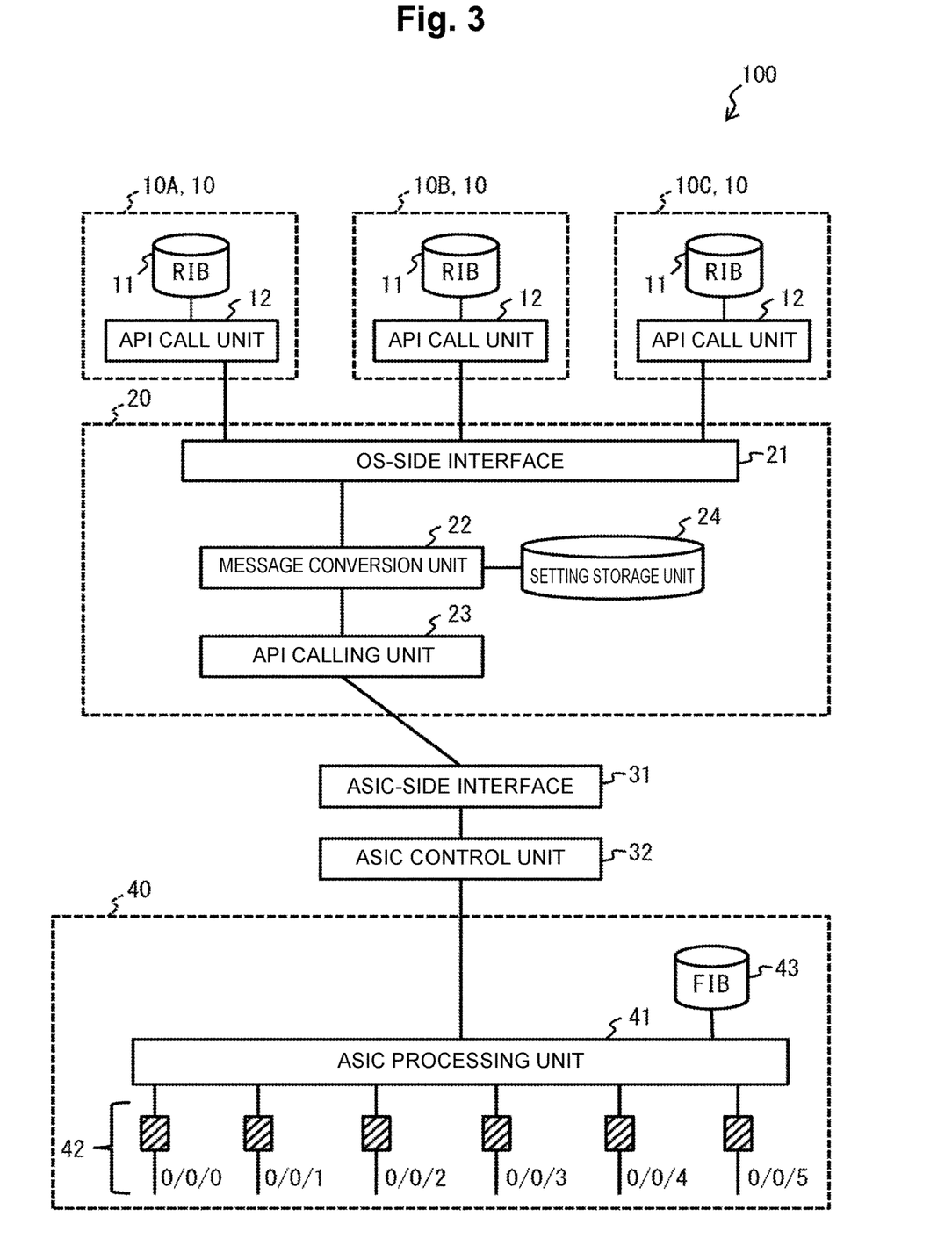
FIG. 3 is a configuration diagram showing details of the data node shown in FIG. 1 according to the present embodiment.

FIG. 3 is a configuration diagram showing details of the data node 100 shown in FIG. 1.

The data node 100 includes the plural NOSs 10 as software-based processing units configured to perform route management and the like, the bridge layer 20, an ASIC-side interface 31, an ASIC control unit 32, and a hardware layer 40.

Each of the NOSs 10 includes an RIB (Routing Information Base) 11 and an API call unit 12. Furthermore, each of the NOSs 10 includes non-illustrated routing engine (route computing unit) and setting input UIs (User Interfaces) such as a CLI (Command Line Interface) and Netconf.

The bridge layer 20 includes an OS-side interface 21, a message conversion unit (message processing unit) 22, an API calling unit 23, and a setting storage unit 24.

As the hardware layer 40 that performs data transfer, the data node 100 includes the ASIC processing unit 41, PHYs 42, and the FIB 43.

The method for installing the NOSs 10 can basically conform to a method recommended by each NOS 10. On the other hand, whereas the ASIC-side interface 31 is set to be referred to during conventional installation, a reference address of the NOS 10, port information, and the like are set such that the OS-side interface 21 will be referred to during installation of the data node 100 according to the present embodiment.

Figure 4:
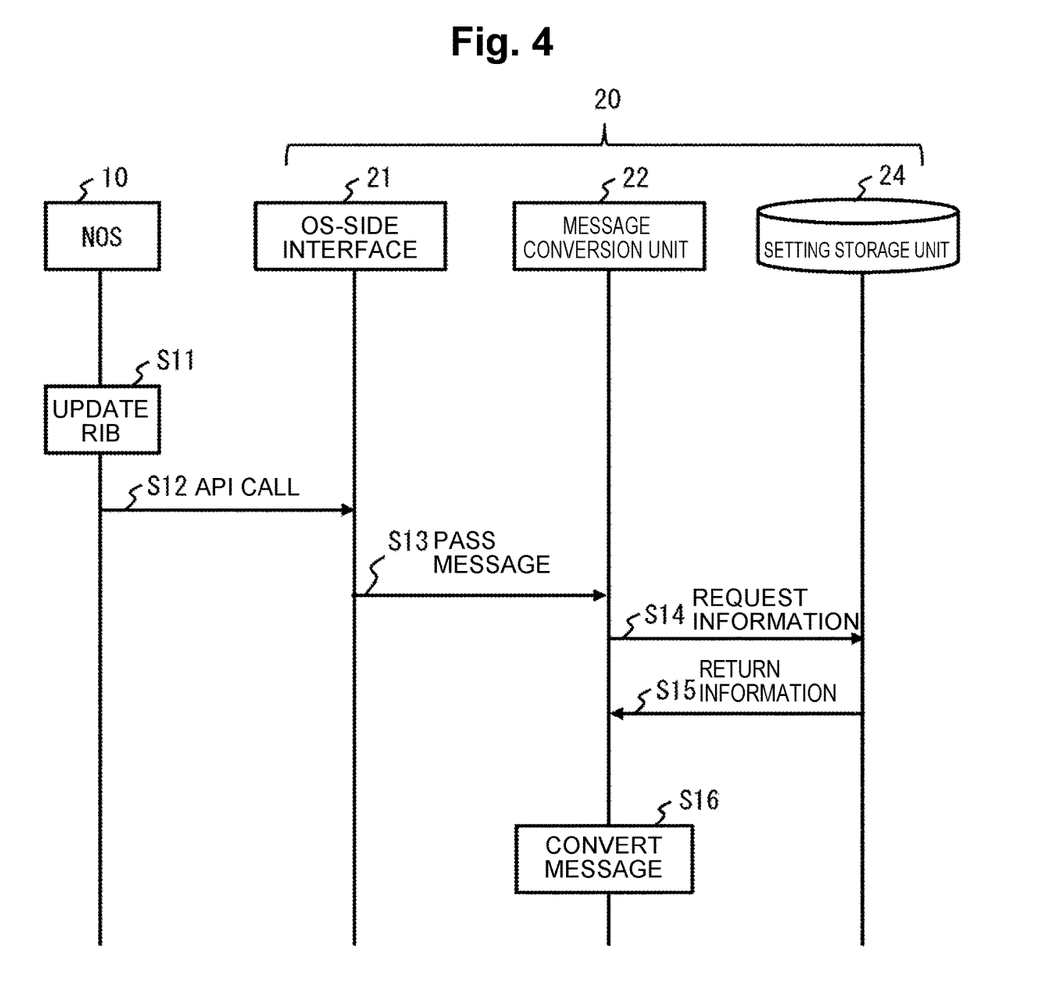
FIG. 4 is a sequence diagram showing a process of the data node according to the present embodiment.

The components in FIG. 3 will be clarified by referring to the sequence diagram of FIG. 4 as appropriate.

Routing information calculated based on a routing protocol such as BGP (Border Gateway Protocol) operating on the NOS 10 is stored in the RIB 11 of the NOS 10. The routing information in the RIB 11 is updated as appropriate along with changes in network topology (S11).

To reflect the latest routing information stored in the RIB 11 in a transfer process performed by the ASIC processing unit 41 of the NOS 10, the API call unit 12 sends an API call to the OS-side interface 21 requesting a write into the FIB 43 (S12).

The OS-side interface 21 receives an API call from the API call unit 12 of each NOS 10 and passes the API call to the message conversion unit 22 via a message (S13). The message conversion unit 22 requests resource information from the setting storage unit 24 (S14) and acquires an answer to the request (S15), where the resource information (for details, refer to port information, I/F information, and the like in FIG. 6) is referred to in message conversion described later in S16. The resource information is stored as a setting file or a database in the setting storage unit 24.

The message conversion unit 22 converts resource information indicated by the API call passed in S13 and to be written out to the FIB 43 into a message as appropriate such that the resource information to be written out to the FIB 43 indicated by the API call will not conflict among the NOSs 10 (S16).

Figure 5:
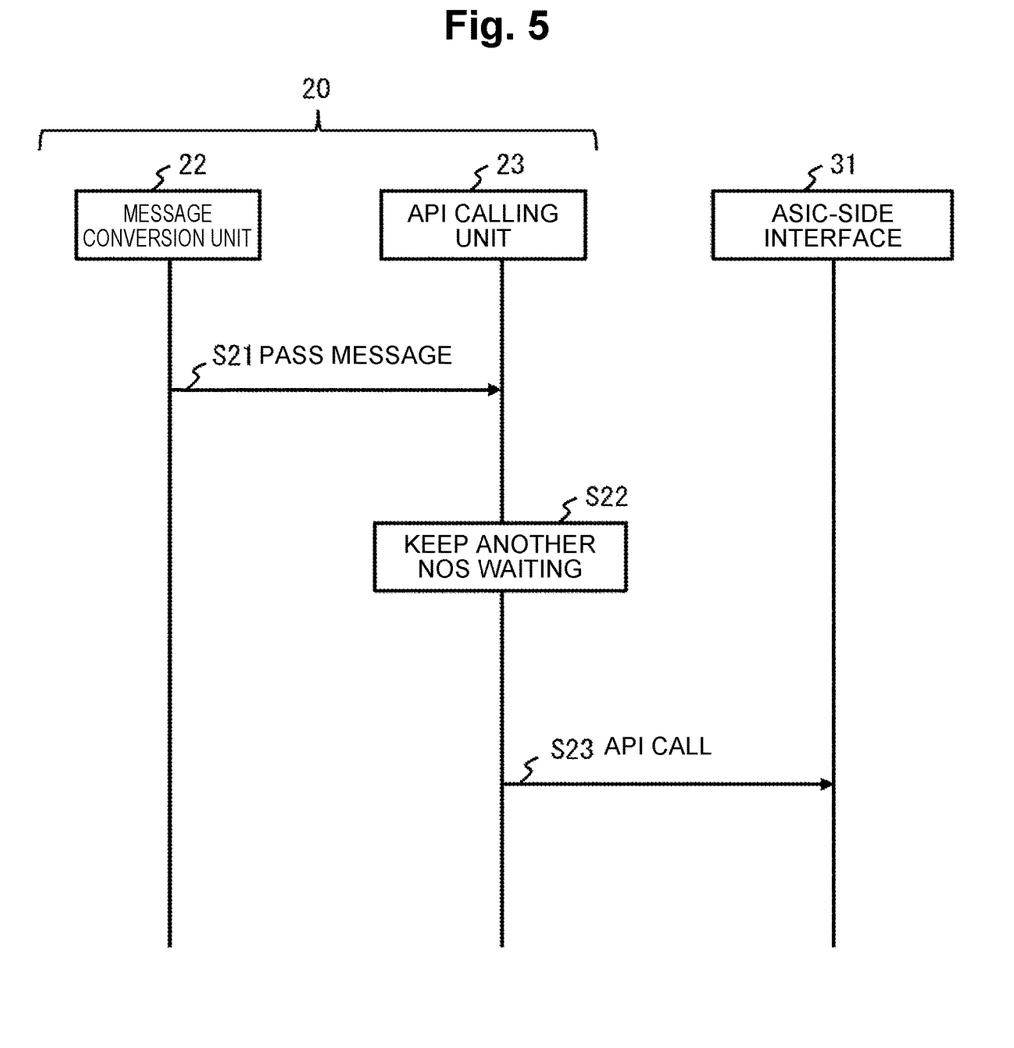
FIG. 5 is a sequence diagram showing a process of the data node according to the present embodiment.

The components in FIG. 3 will be clarified by referring to the sequence diagram of FIG. 5 as appropriate.

The message conversion unit 22 passes the message (API call) converted in S16 to the API calling unit 23 (S21).

The API calling unit 23 subjects the message passed in S21 (API call of an NOS 10) to a waiting process (S22) so as not to conflict with API calls from other NOSs 10, and thereafter sends the API call to the ASIC-side interface 31 (S23).

That is, the API calling unit 23 waits for plural messages by turns so as to make the ASIC-side interface 31 process only one message at a time.

For example, after sending the message from the NOS 10A to the ASIC-side interface 31, when a response to the message is returned from the ASIC-side interface 31, the API calling unit 23 sends the message received from the NOS 10B to the ASIC-side interface 31.

Returning to FIG. 3, the ASIC-side interface 31 is middleware needed in using the ASIC control unit 32 and is provided as an original SDK (Software Development Kit) of a communications equipment vendor or an API (Application Programming Interface) that is openly available. For example, the following APIs are open to the public.

OF-DPA (OpenFlow Data Plane Abstraction)
Open NSL (Network Switch Layer)
SAI (Switch Abstraction Interface)

The ASIC control unit 32 is a control driver dependent on the hardware layer 40 and is provided by a communications equipment vendor.

The ASIC processing unit 41 performs hardware-based high-speed packet transmission (forwarding) to external devices via the PHYs 42 based on contents described in the FIB 43. Note that the PHYs 42 are assigned port numbers (0/0/0 to 0/0/5).

The API call sent to the ASIC-side interface 31 in S23 is sent to the ASIC control unit 32 to the ASIC processing unit 41 and to the FIB 43, thereby causing contents of the FIB 43 to be overwritten.

This allows the ASIC processing unit 41 to exchange data packets with another device via an appropriate port learned with reference to the latest FIB 43. The ASIC processing unit 41 can also receive a control packet (such as link-state of a routing protocol) needed in updating the RIB 11 from another device and transfer the control packet to an appropriate one of the NOSs 10 of the data node 100 with reference to the latest FIB 43.

Figure 6:
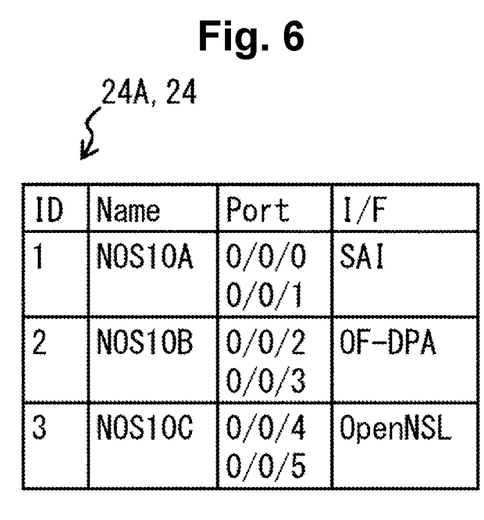
FIG. 6 is a configuration diagram showing a first example of a setting storage unit according to the present embodiment.

FIG. 6 is a configuration diagram showing a first example of the setting storage unit 24.

In the setting storage unit 24, in connection with an identifier (ID, Name) of each NOS 10, a list (Port) of port information about the PHY 42 to be used is associated with the ASIC-side interface 31 (I/F) to be used in writing data into the FIB 43. Note that although not illustrated, as resource information to be used by the NOS 10, routing information (such as route 0.0.0.1 in FIG. 1) and the like may be associated with the ASIC-side interface 31 in addition to the port information.

In this way, if the ASIC-side interface 31 to be used and the PHY 42 to be used are separated for each NOS 10 and registered in the setting storage unit 24 in advance, the plural NOSs 10 can use the same ASIC processing unit 41 concurrently while using the respective individual PHYs 42.

Description will be given below of an example of a message conversion process (S16) performed by the message conversion unit 22 to avoid overlap when an API call is received from the NOS 10C.

First, consider a case in which the port information (Port=0/0/4, 0/0/5) about the NOS 10C registered in the setting storage unit 24 is known to the NOS 10C. At this time, if a port other than "Port=0/0/4, 0/0/5" is specified in an API call received from the NOS 10C, this is an error on the side of the NOS 10C. Thus, the message conversion unit 22 can reject the erroneous API call.

On the other hand, when the port information (Port=0/0/4, 0/0/5) in the setting storage unit 24 is not known to the NOS 10C, the message conversion unit 22 can convert ports other than "Port=0/0/4, 0/0/5" in the API call received from the NOS 10C as follows.

"Port=0/0/0" (before conversion) into "Port=0/0/4" (after conversion)
"Port=0/0/1" (before conversion) into "Port=0/0/5" (after conversion)

An example of entries in the FIB 43 (VLAN table) before conversion is shown below.
Table ID 10 (VLAN):
  inPort=0(Physical) vlanId:mask=0x0000:0x1fff (VLAN 0)|GoTo=20 . . . .
  inPort=1(Physical) vlanId:mask=0x0000:0x1fff (VLAN 0)|GoTo=20 . . . .

An example of entries in the FIB 43 (VLAN table) after conversion is shown below.
Table ID 10 (VLAN):
  inPort=4(Physical) vlanId:mask=0x0000:0x1fff (VLAN 0)|GoTo=20 . . . .
  inPort=5(Physical) vlanId:mask=0x0000:0x1fff (VLAN 0)|GoTo=20 . . . .

The numeral before "(Physical)" is the port number (which corresponds to N in Port=0/0/N).

The message conversion unit 22 may also convert routing information. An example in which a number contained in the ID column of the setting storage unit 24 is written as it is into a vrf field of the FIB 43 is shown below.

An example of the vrf field before conversion is shown below.
Table ID 30 (Unicast Routing):
  etherType=0x0800 vrf=0x0000 dstIp4=100.100.0.0/255.255.255.252|GoTo=60

An example of the vrf field after conversion is shown below.
Table ID 30 (Unicast Routing):
  etherType=0x0800 vrf=0x0003 dstIp4=100.100.0.0/255.255.255.252|GoTo=60

The routing information has been converted such that the last digit "3" in "vrf=0x0003" will coincide with the entry "3" of the ID column corresponding to the NOS 10C in the setting storage unit 24.

Figure 7:
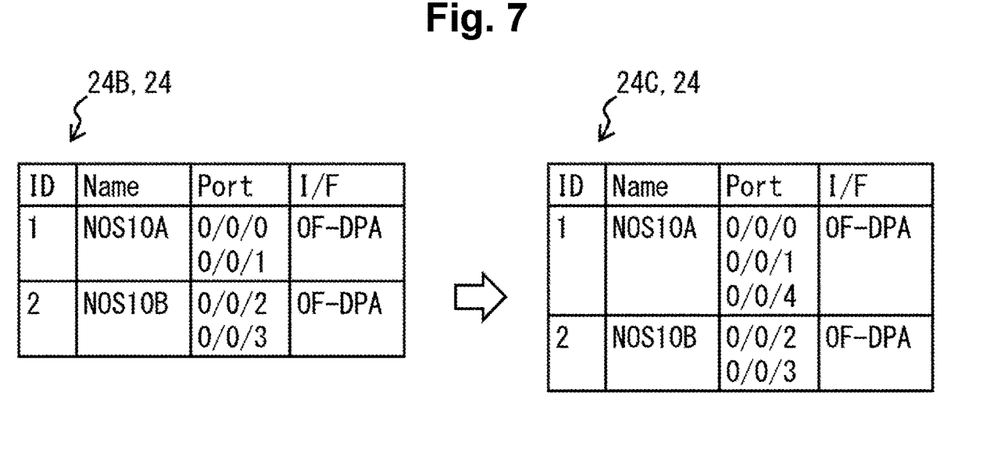
FIG. 7 is a configuration diagram showing a second example of the setting storage unit according to the present embodiment.

FIG. 7 is a configuration diagram showing a second example of the setting storage unit 24.

Here, description will be given of an example of a setting storage unit 24B in which two NOSs 10 (NOS 10A, NOS 10B) have been installed and which uses four pieces of port information (Port=0/0/0 to 0/0/3).

If a fifth piece of port information (Port=0/0/4) is newly added, the message conversion unit 22 newly adds Port=0/0/4 to the NOS 10A under high load as a process requested from the setting storage unit 24B in S14. Consequently, the setting storage unit 24B is updated to the setting storage unit 24C.

The message conversion unit 22 can handle reduction in the number of ports similarly by updating the Port column in the setting storage unit 24C.

[Effects]

The data node 100 according to the present invention includes a bridge layer 20 adapted to mediate messages between a hardware layer 40 that transfers data with reference to an FIB 43 indicating a forwarding address and a plurality of NOSs 10 that set contents of the FIB 43 for the hardware layer 40, wherein the bridge layer 20 includes: a setting storage unit 24 adapted to store setting information to be associated with those resources of the hardware layer 40 which are available for use by the NOSs 10, and a message conversion unit 22 adapted to receive messages setting the contents of the FIB 43 from the NOSs 10, convert the messages according to the setting information in the setting storage unit 24 so as to contain those resources of the hardware layer 40 which are available for use by the NOSs 10, and update the contents of the FIB 43 based on the converted messages.

Consequently, in the bridge layer 20, by mediating message exchange with the hardware layer 40, resource conflict among the plural NOSs 10 is avoided in connection with writes into the FIB 43 when the RIBs 11 are changed in the plural NOSs 10.

Thus, because plural NOSs 10 can be used simultaneously and concurrently on a single piece of white box equipment (data node 100) without adding functions to the NOSs 10 or the hardware layer 40, the usage efficiency of resources on the single hardware layer 40 can be improved.

The present invention includes a bridge layer 20 adapted to mediate messages between a hardware layer 40 that transfers data with reference to an FIB 43 indicating a forwarding address and a plurality of NOSs 10 that set contents of the FIB 43 for the hardware layer 40, wherein the bridge layer 20 adapted to store setting information to be associated with those resources of the hardware layer 40 which are available for use by the NOSs 10, and a message conversion unit 22 adapted to receive messages setting the contents of the FIB 43 from the NOSs 10, and update the contents of the FIB 43 based on the messages containing those resources of the hardware layer 40 which are available for use by the NOSs 10, with reference to the setting information in the setting storage unit 24, while rejecting messages containing those resources of the hardware layer 40 which are unavailable for use by the NOSs 10.

Thus, by limiting those resources of the hardware layer 40 which are available for use by each of the plural NOSs, it is possible to avoid resource conflict among the plural NOSs 10 in connection with writes into the FIB 43.

In the present invention, the data node 100 further includes an API calling unit 23, wherein in a process in which the API calling unit 23 transmits a message containing those resources of the hardware layer 40 which are available for use by the NOSs 10 to the hardware layer 40, causing contents of the FIB 43 to be updated, until a message from one of the NOSs 10 is completed, message transmission from another of the NOSs 10 is kept waiting.

This makes it possible to avoid conflict (write conflict) during a write into the FIB 43.

REFERENCE SIGNS LIST

10 NOS
11 RIB
12 API call unit
20 Bridge layer
21 OS-side interface
22 Message conversion unit (message processing unit)
23 API calling unit
24 Setting storage unit
31 ASIC-side interface
32 ASIC control unit
40 Hardware layer
41 ASIC processing unit
42 PHY
43 FIB
100 Data node

The invention claimed is:

1. A data node comprising:
a bridge layer adapted to mediate messages between a hardware layer that transfers data with reference to an Forwarding Information Base (FIB) indicating a forwarding address and a plurality of (Network Operating Systems (NOSs) that set contents of the FIB for the hardware layer, wherein
the bridge layer includes:
a setting storage medium adapted to store setting information that associates the plurality of NOSs with resources of the hardware layer which are available for use by the plurality of NOSs, wherein the resources of the hardware layer comprise one or more ports available for each NOS among the plurality of NOSs, and
a message processing unit, including one or more processors, adapted to receive a message setting the contents of the FIB from a particular NOS among the plurality of NOSs, wherein the message comprises first port information indicating one or more ports unavailable for use by the particular NOS, convert the message according to the setting information in the setting storage medium, wherein the converted message comprises second port information indicating one or more ports available for use by the particular NOS, and update the contents of the FIB based on the converted message.

2. A data node comprising:
a bridge layer adapted to mediate messages between a hardware layer that transfers data with reference to an FIB indicating a forwarding address and a plurality of NOSs that set contents of the FIB for the hardware layer, wherein
the bridge layer includes:
a setting storage medium adapted to store setting information that associates the plurality of NOSs with resources of the hardware layer which are available for use by the NOSs, wherein the resources of the hardware layer comprise one or more ports available for each NOS among the plurality of NOSs, and
a message processing unit, including one or more processors, adapted to receive a message setting the contents of the FIB from a particular NOS among the plurality of NOSs, wherein the message comprises port information indicating one or more ports available for use by the particular NOS, and update the contents of the FIB based on the message, with reference to the setting information in the setting storage medium, while rejecting messages comprising port information indicating one or more ports unavailable for use by the particular NOS.

3. The data node according to claim 1, further comprising an API calling unit including one or more processors, wherein in a process in which the API calling unit transmits the message containing the resources of the hardware layer which are available for use by the plurality of NOSs to the hardware layer, causing the contents of the FIB to be updated, until the message from one of the plurality of NOSs is completed, message transmission from another of the plurality of NOSs is kept waiting.

4. A method for managing a data node that includes a bridge layer adapted to mediate messages between a hardware layer that transfers data with reference to a Forwarding Information Base (FIB) indicating a forwarding address and a plurality of Network Operating Systems (NOSs) that set contents of the FIB for the hardware layer, wherein:

the bridge layer includes a setting storage medium, and a message processing unit;

the method comprises:

setting information that associates the plurality of NOSs with resources of the hardware layer which are available for use by the plurality of NOSs is stored in the setting storage medium, wherein the resources of the hardware layer comprise one or more ports available for each NOS among the plurality of NOSs; and receiving, by the message processing unit, a message setting the contents of the FIB from a particular NOS among the plurality of NOSs, wherein the message comprises first port information indicating one or more ports unavailable for use by the particular NOS;

converting the message according to the setting information in the setting storage medium, wherein the converted message comprises second port information indicating one or more ports available for use by the plurality of NOSs; and updating the contents of the FIB based on the converted message.

5. The method for managing the data node according to claim 4, further comprising:

updating the contents of the FIB based on the converted message comprising the second port information indicating one or more ports available for use by the particular NOS, with reference to the setting information in the setting storage medium, while rejecting messages containing port information indicating one or more ports unavailable for use by the particular NOS.

6. A non-transitory computer readable medium storing one or more instructions that cause a computer to function as the data node according to claim 1.

7. The data node according to claim 2, further comprising an API calling unit including one or more processors, wherein in a process in which the API calling unit transmits the message containing the resources of the hardware layer which are available for use by the plurality of NOSs to the hardware layer, causing the contents of the FIB to be updated, until the message from one of the plurality of NOSs is completed, message transmission from another of the plurality of NOSs is kept waiting.

8. The method for managing the data node according to claim 4, further comprising:

in a process in which an API calling unit including one or more processors transmits the message containing the resources of the hardware layer which are available for use by the plurality of NOSs to the hardware layer, causing the contents of the FIB to be updated, until the message from one of the plurality of NOSs is completed, message transmission from another of the plurality of NOSs is kept waiting.

* * * * *